United States Patent [19]

Drake

[11] Patent Number: 5,161,898
[45] Date of Patent: Nov. 10, 1992

[54] ALUMINIDE COATED BEARING ELEMENTS FOR ROLLER CUTTER DRILL BITS

[75] Inventor: Eric F. Drake, Pearland, Tex.

[73] Assignee: Camco International Inc.

[21] Appl. No.: 726,024

[22] Filed: Jul. 5, 1991

[51] Int. Cl.[5] .............................. F16C 17/12
[52] U.S. Cl. ..................... 384/95; 384/912; 384/913; 384/901
[58] Field of Search ............... 384/95, 91, 912, 913, 384/625, 901

[56] References Cited

U.S. PATENT DOCUMENTS

| | | |
|---|---|---|
| 3,235,316 | 2/1966 | Whanger . |
| 3,544,348 | 12/1970 | Boone et al. . |
| 3,674,575 | 7/1972 | Prill et al. . |
| 3,721,307 | 3/1973 | Mayo . |
| 3,917,361 | 11/1975 | Murdoch . |
| 3,990,751 | 11/1976 | Murdoch . |
| 3,995,917 | 12/1976 | Quinlan . |
| 4,012,238 | 3/1977 | Scales . |
| 4,074,922 | 2/1978 | Murdoch . |
| 4,102,838 | 7/1978 | Scales . |
| 4,105,263 | 8/1978 | Sorensen et al. . |
| 4,109,974 | 8/1978 | Svanstrom et al. . |
| 4,132,816 | 2/1979 | Benden et al. . |
| 4,142,023 | 2/1979 | Bornstein et al. . |
| 4,323,284 | 4/1982 | Childers et al. . |
| 4,416,554 | 11/1983 | Pribbenow . |
| 4,439,050 | 3/1984 | Garner . |
| 4,618,269 | 10/1986 | Bradrak et al. . |
| 4,641,976 | 2/1987 | Kar . |
| 4,769,210 | 9/1988 | Campbell . |
| 4,897,315 | 1/1990 | Gupta . |
| 4,910,092 | 3/1990 | Olson et al. . |
| 4,944,858 | 7/1990 | Murphy et al. . |
| 4,969,378 | 11/1990 | Lu et al. . |
| 4,983,239 | 6/1990 | Olson et al. . |

*Primary Examiner*—Lenard A. Footland
*Attorney, Agent, or Firm*—Dodge, Bush, Moseley & Riddle

[57] ABSTRACT

A roller cutter drill bit (10) has separate bearing elements (82, 84, 86) positioned between a journal (20) and a roller cutter (60) mounted for rotation on the journal (20). The bearing elements (82, 84, 86) are formed of a superalloy material and the bearing surfaces of the bearing elements (82, 84, 86) have an aluminide coating applied thereon to form a bearing surface stable at operating temperatures over 500 F. and as high as 1000 F.

6 Claims, 1 Drawing Sheet

ALUMINIDE COATED BEARING ELEMENTS FOR ROLLER CUTTER DRILL BITS

FIELD OF THE INVENTION

This invention relates to sliding or friction bearing elements for roller cutter drill bits and the method of making same, and more particularly to such bearing elements positioned between or disposed upon the roller cutters and the journal shafts on which the cutters are mounted for rotation.

BACKGROUND OF THE INVENTION

Typical roller cutter journal bearings are configured to separate the operational loads of each cutter into radial and thrust components with a plurality of each type of bearing disposed within a sealed, lubricated, lug-cutter system. Radial and thrust bearings may differ by design as to their loading, but more fundamentally they differ in their contact dynamics. Sliding contact can be essentially continuous for a rotating thrust bearing, whereas any portion of a rotating radial bearing cycles in and out of contact during each revolution.

Both types of friction bearings are designed for use at very high PV ranges (pressure X velocity product), often over a million ft.lb/in$^2$ min. Dynamic compressive operating stresses may have peak values in the 30,000–80,000 psi range, with frictional shear components superimposed. Even higher stresses may be experienced due to bending in "floating" bushing or washer elements such as disclosed in U.S. Pat. Nos. 3,721,307; 3,917,361; 3,990,751; and 4,439,050, which are favored in bit bearing designs because of their differential sliding characteristics. Moreover, ambient operating temperatures in the well bore environment are commonly between 150°–400° F., and seal leakage often introduces abrasive and corrosive contaminants into the bearing system at some point in the life of the bit.

These conditions substantially limit the range of suitable material couple/lubricant options available for bit use. Dissimilar metals have been used to reduce galling tendencies and extreme pressure greases with solid lubricant additives are also commonly employed. When floating members are used or when thick, continuous inlays such as disclosed in U.S. Pat. Nos. 3,995,917 and 4,416,554 are incorporated in journal or cutter surfaces, materials having minimum yield strengths of about 140,000 psi are needed to avoid macroscopic plastic deformation in service.

In addition, many material couples exhibit friction coefficients in this type of service which are sufficiently high to cause significant internal heating of the bearing system. Under such conditions, temperature may become the limiting factor in bit bearing performance due to its effects on tribological behavior and structural integrity of the bearing elements, as well as its effects on elastomer seal components commonly utilized in rotary bits. Laboratory testing has shown that transitions in the frictional behavior of the sliding surfaces are associated with thermal spikes which precede the onset of catastrophic bearing failure.

For these reasons, the ultimate load capacity, life expectancy, and performance consistency of roller cutter drill bit bearings are extremely sensitive to the mechanical and tribological behavior of bearing surfaces and substrate material. Few alternatives can provide the necessary combination of strength, ductility, temperature stability, and low friction in the operating regime of rock bits. In addition, fabricability imposes another difficult set of constraints, because of close dimensional tolerances, and the integrated, multi-element design of stationary and rotating components.

Materials used in combination with the hardened steel surfaces in bit journal bearings have included precipitation hardened copper-beryllium (shown in U.S. Pat. Nos. 3,721,307 and 3,917,361), spinodally-hardened copper-tin-nickel (shown in U.S. Pat. No. 4,641,976), aluminum bronzes (shown in U.S. Pat. No. 3,995,917), and cobalt-based stellite alloys (shown in U.S. Pat. No. 4,323,284). These materials offer suitable ambient temperature yield strengths for use as structural elements or inlays, and acceptable anti-galling properties against hardened steel. However, at elevated PVs they can undergo a transition to high-friction operation, and except for the stellites, these alloys exhibit a rapid reduction in yield strength at temperatures above about 500° F. Because such surface temperatures are not uncommon in bit thrust bearings, stellites have been the structural inlay material of choice for journal surfaces. Furthermore, since heat transfer is restricted in floating elements, floating-thrust-washer designs have been largely precluded particularly for high speed bit applications. As bit journal bearings are pushed to higher PVs through the use of high speed downhole motors and increasing rig capacities, floating radial bearing elements are also becoming subject to thermal failure modes.

Discontinuous inlays or thin coatings of essentially non-structural, low-strength metals have been used to modify high-PV tribological behavior of bit friction bearings on both a micro- and macro-scale. Such materials as copper, silver, silver-manganese, lead, tin, and indium have been incorporated in bits in various ways such as described in U.S. Pat. Nos. 3,235,316; 3,990,751; 4,074,922; and 4,109,974. These discontinuous inlays or thin coatings act as surface modifiers in asperity interactions to retard galling and to serve as "solid" lubricants at pressures which exceed the film strength of greases under boundary-lubrication conditions. However, they are sensitive in their performance to placement within the system. They also reduce structural strength of the load surfaces and can add to effective bearing clearance. In addition, at elevated temperatures, the functuality of such discontinuous inlays or thin coatings may be altered as melting temperatures are approached.

Hard, thin coatings constitute another class of tribological materials which have been used with some success in rock bit bearings. These have been incorporated onto lug or cutterbore steel substrates by processes such as boronizing, ion-nitriding, and flame- or plasma-deposition of carbide composites, such as described in U.S. Pat. Nos. 4,012,238; 4,102,838; 4,618,269; and 4,969,378. Diamond surfaces have also been proposed as in U.S. Pat. No. 4,802,539. While these approaches offer low-friction and anti-galling advantages, they are limited in their use by brittleness and mechanical property mismatches with the available substrates, and by configurational constraints on their incorporation in practical bearing designs. As such, they have not been suitable for use with floating elements.

Thus, the art has not heretofore simultaneously addressed the current thermal limitations of both the surface and substrate of high-PV sliding rock bit bearings, and particularly floating bearing elements which entail higher strength and thermal stability demands.

The aerospace field has provided tremendous advances in the development of high-strength, high-temperature, corrosion-resistant "super-alloys" notably for use in turbo-machinery. These comprise nickel-, iron- and cobalt-based, solid-solution-strengthened and precipitation-strengthened alloys which exhibit superior yield strength and creep resistance at elevated temperatures. (ref: "The Superalloys" J. Wiley, New York, 1972; Metals Handbook, Ninth Ed. Volume 3, p207-268).

A parallel effort in the development of coatings to enhance the erosion- and corrosion-resistance of superalloy surfaces subjected to high-velocity gas streams has produced a variety of intermetallic coatings which are known to exhibit excellent chemical and thermal stability. Aluminides are a prominent class of such intermetallic coatings which entail ordered compounds of aluminum with other metals such as nickel, iron, cobalt, and/or titanium. In particular, conversion coating of nickel-base substrates via surface aluminimizing and high-temperature diffusion to form nickel aluminide coatings has been described in U.S. Pat. Nos. 3,544,348, 4,132,816, and 4,142,023. Minor additions of other elements such as boron, actinide- or lanthanide-series elements are also recognized as offering property enhancements of nickel aluminide materials, such as disclosed in U.S. Pat. Nos. 4,933,239 and 4,944,858. Superalloy substrates coated with aluminide materials of this type have found extensive application in turbine blades.

More recently, nickel-aluminide coatings have been observed to exhibit low-galling tendency in contact with steel in molten sodium environments. U.S. Pat. No. 4,769,210 describes such an application for plasma- or detonation-gun-coated reactor components. The galling resistance and corrosion resistance of aluminide coatings has enabled their application as a sealing surface against Hastelloy C-276 in all metal subsurface safety valves for corrosive oilfield environments.

SUMMARY OF THE PRESENT INVENTION

The present invention is directed to aluminide-coated superalloy sliding bearing elements for roller cutter drill bits.

Superalloys are a class of known materials which exhibit desirable mechanical properties at high temperatures. These alloys generally contain major amounts of nickel, cobalt, and/or iron used alone or in combination with each other. Superalloys are more fully described by the above Wiley reference incorporated herein by reference. Various intermetallic coatings have been developed for surface protection of the superalloy base material in hostile environments. In particular aluminides are a class of intermetallic coatings providing superior chemical and thermal stability when combined with iron, nickel, cobalt, and/or titanium on an iron, nickel, or cobalt-based superalloy substrate.

The combination of an aluminide coating and a superalloy substrate material to form a sliding bearing element in a roller cutter drill bit provides increased bearing performance and consistency under high-PV operating conditions encountered in rock bit service. The mechanical behavior of this coating/substrate combination extends the range of bit bearing operating temperatures, provides improved bearing recoverability from load and friction spikes, and allows the use of floating element bearing designs in higher-stress, higher-velocity applications.

This is achieved through the combination of improved high-temperature mechanical properties of the substrate along with the tribological characteristics of the aluminide coating. Aluminide coatings are particularly adapted for use with nickel-base superalloys such as Inconel 718, which may be formed from strip, powders, or machined or cast to produce thin bushing or washer elements which are subsequently diffusion-coated to a thickness of preferably about 0.005 inch, and thermally treated to a yield strength of more than about 140,000 psi. The coated bearing element components are then preferably finished to a roughness of less than about 20 microinches Ra, using diamond abrasives disposed upon a compliant substrate, whereupon the components are ready for assembly into the roller cutter drill bit, for example, as a floating thrust washer, a radial bushing element, or a combination element such as a conical bushing element, for example. Alternatively, some of the benefits of this invention may be realized through the incorporation of a bushing or washer bearing element by bonding or interference-fitting as fixed components on the journal or within the roller cutter.

The functuality of this invention as a rock bit bearing element depends upon the combination of 1) a superalloy substrate providing high temperature yield strength in combination with high toughness; 2) an aluminide intermetallic coating providing an unusual combination of chemical and thermal stability, deformation resistance, galling resistance, toughness, and substrate adherence without which coating the superalloy substrate would be prone to rapid galling and seizure; and 3) a means of finishing the aluminide surface to a suitable low roughness. This third requirement is particularly problematic in that the properties which make an aluminide a good tribological material render it difficult to finish and the available coating means produce a rough finish in spite of the initial substrate condition.

It is an object of this invention to provide aluminide coated superalloy sliding bearing elements for roller cutter drill bits.

It is a further object of this invention to provide a method for applying an aluminide coating to a superalloy bearing element and finishing the coated surface to provide for its use in a roller cutter drill bit.

It is an additional object of this invention to provide such an aluminide coating and method of application to a superalloy substrate selected from the group consisting of nickel, cobalt, and iron.

Another object of the invention is to provide an aluminide coated nickel base superalloy bearing element for a roller cutter drill bit particularly adapted for use at bearing surface temperatures at around 500° F. and as high as around 100° F.

Other objects, features, and advantages of the invention become more apparent after referring to the following specification and drawings.

DESCRIPTION OF THE INVENTION

Figure 1:
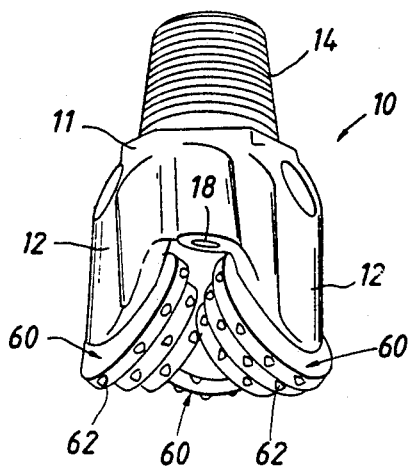
FIG. 1 is a perspective of a roller cutter type drill bit embodying the present invention.
Figure 2:
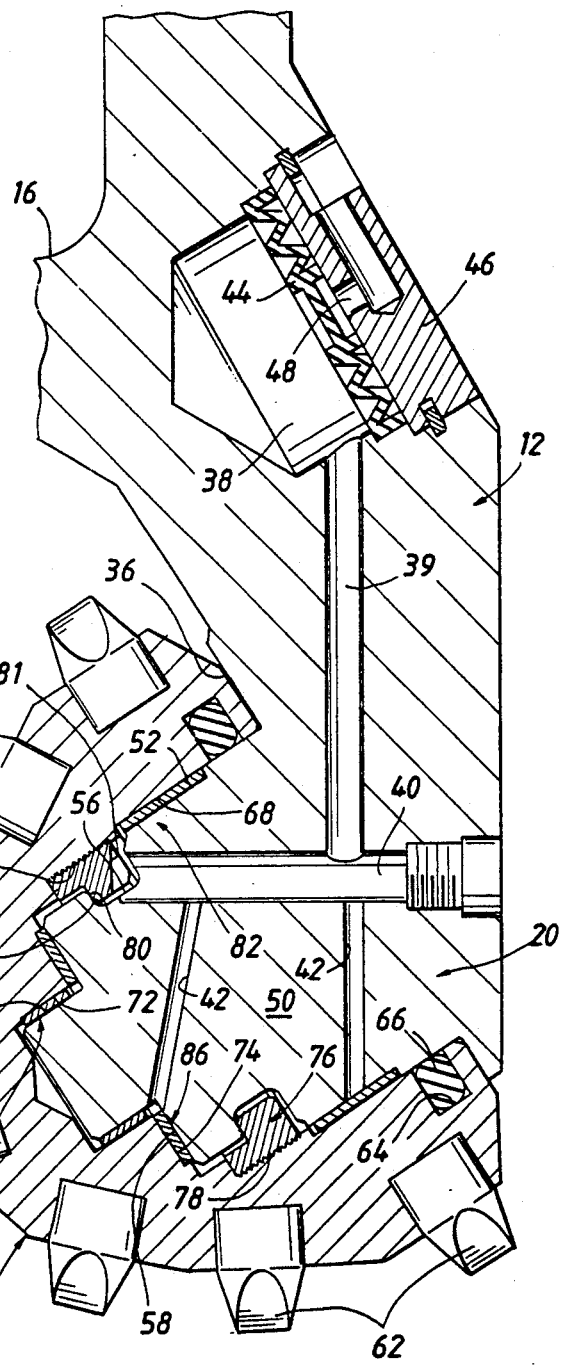
FIG. 2 is an enlarged section of a projecting leg or lug of the drill bit of FIG. 1 including a journal and roller cutter mounted on the journal for rotation and having bearing elements employing the present invention.

Referring particularly to the drawings for a better understanding of this invention, a triple cone rotary drill bit shown partially at 10 includes a bit body 11 having a leg or lug generally indicated at 12 and a threaded upper end 14 adapted for connection to the lower end of a drill string (not shown) for receiving drilling fluid within a fluid chamber shown partially at 16 in FIG. 2. Drilling fluid from chamber 16 is discharged through discharge port or nozzle 18 into the bore hole.

A bearing journal generally indicated at 20 extends inwardly of leg 12 from the lower end thereof adjacent annular face or surface 36 of leg 20. Lubricant is supplied to the bearing areas of journal 20 from a lubricant reservoir 38 through lubricant channel 39 to channel 40 and then through lubricant passages 42 to the bearing areas. A flexible diaphragm 44 seals reservoir 38 and end plug 46 holds diaphragm 44 in position. Plug 46 has an opening 48 in fluid communication with the exterior of the drill bit so that diaphragm 44 is exposed on opposite sides thereof to the lubricant and to the drilling fluid. Thus, diaphragm 44 acts as a pressure compensator between the drilling fluid and lubricant by being responsive to fluid pressure differentials between the drilling fluid and lubricant.

Journal 20 has a main body portion 50 including a large diameter outer circumferential surface portion 52 forming a main bearing surface and a small diameter outer circumferential surface portion 54 forming a nose bearing surface. An annular groove 56 is positioned between circumferential portions 52 and 54. A flat annular surface 58 is provided on journal body 50 adjacent outer small diameter circumferential portion 54 and extends at right angles to circumferential portion 54 to form a thrust bearing surface.

A roller cutter generally indicated at 60 is mounted for rotation on bearing journal 20 and has cutting elements or inserts 62 projecting therefrom for engaging the adjacent formation in cutting relation. Cutter 60 has an internal bore receiving journal 20 and an internal annular groove is provided at 64 adjacent surface 36 to receive an elastomeric sealing ring 66 to prevent drilling fluid from entering the bearing areas. The internal bore of roller cutter 60 defines a large diameter internal bore portion 68 which includes a threaded section 70, and a small diameter internal bore portion 72. A flat thrust bearing shoulder 74 extends between small diameter bore portion 72 and large diameter bore portion 68. To secure roller cutter 60 onto journal 20 for rotation, an externally threaded ring shown generally at 76 fits within annular groove 56 and has external screw threads 78 which engage internal screw threads on threaded section 70 to secure roller cutter 60 onto journal 20. Threaded ring 76 has a thrust shoulder 79 which is in abutting contact with opposed shoulder 80 defined by groove 56. Threaded ring 76 is formed of two semicircular sections for fitting within groove 56 and a notch 81 in one of the semicircular sections is adapted to receive a tool within channel 40 to prevent rotation of ring 76 during threading of cutter 60 onto ring 76.

Figure 5:
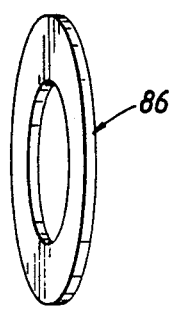
FIG. 5 is an enlarged flat washer-type thrust bearing element removed from between the roller cutter and journal shown in FIG. 2.

Mounted in an annular space between surfaces 52 and 68 is a large diameter split radial bushing or sleeve generally indicated at 82 to provide a bearing element. Mounted in an annular space between surfaces 54 and 72 is a small diameter split radial bushing or sleeve generally indicated at 84 to provide a bearing element. Mounted in a space between surfaces or shoulders 58 and 74 is a flat thrust washer or bearing element generally indicated at 86. Radial bushings 82, 84 and thrust washer 86 define opposed bearing surfaces in frictional or sliding contact with opposed bearing surfaces on roller cutter 60 and journal 20. Thus, bearing surfaces between journal 20 and roller cutter 60 are provided by radial bushings 82, 84, thrust washer 86, and threaded retainer ring 76. Thrust washer 86 is shown in FIG. 5 removed from the bit 10.

Figure 3:
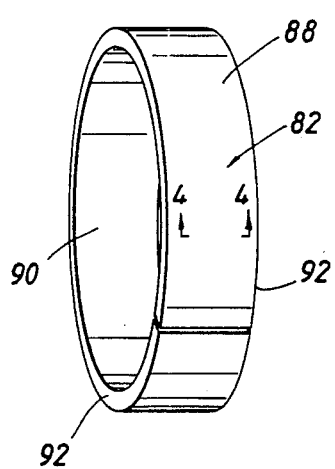
FIG. 3 is an enlarged perspective of a radial bushing-type bearing element embodying the present invention removed from the space between the roller cutter and journal shown in FIG. 2.
Figure 4:
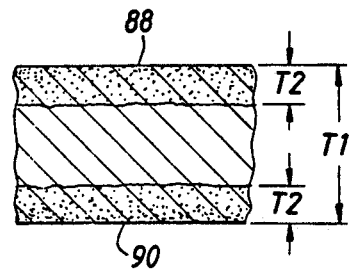
FIG. 4 is an enlarged partial section taken generally along line 4—4 of the bushing element shown in FIG. 3.

Bearing elements 76, 82, 84, and 86 are formed of a superalloy material selected from the group consisting of nickel, cobalt, and iron, and coated with an aluminide coating to provide long life bearing surfaces. The total thickness of bearing elements 82, 84, 86 is preferably between about 1/32 inch and 1/16 inch which is a thickness that can be easily formed and does not require much bearing space. As a specific but non-limiting example of an aluminide coated superalloy bearing element, reference is made to FIGS. 3 and 4 in which main radial bushing or bearing 82 is illustrated having an outer peripheral bearing surface 88 and an inner peripheral bearing surface 90. Radial bushing 82 is of a total thickness T1 of 0.050 inch and is formed of a nickel based superalloy, Inconel 718, heat treated to a room temperature yield strength of over 160,000 psi. An aluminide coating thickness T2 of around 0.005 is provided on edge bearing surfaces 92 in addition to bearing surfaces 88 and 90.

A variety of methods for achieving an aluminide layer are known in the art which basically entail delivering aluminum to the superalloy substrate and using elevated temperatures to control its diffusion and reaction with substrate elements and/or additionally supplied metal species to form a layer of aluminide intermetallic phases. Such methods, for example, have been developed to enhance oxidation and erosion resistance of turbine components, but none of these methods have been utilized to produce aluminide coated rock-bit bearing elements as in the present invention. However, certain process methodologies and material combinations have been shown to be especially suitable for bearing elements, notably nickel-based superalloy substrates pack-diffusion-coated to produce a NiAl-type of structure. Such a coating typically comprises mainly a polycrystalline NiAl phase through $\frac{3}{4}$ of its thickness, with minor amounts of $Ni_2Al_3$ or other possible complex aluminides of niobium, titanium, and/or cobalt. The remaining $\frac{1}{4}$ of the thickness of the coating is often referred to as a "diffusion zone" comprising a normally columnar grain structure with a variety of phases partitioning other substrate constituents such as chromium, iron, niobium, and titanium.

The hardness of the aluminide bearing surfaces formed in accord with the above is around 1000 $kg/mm^2$ KHN (Knoop Hardness Number) and can accommodate room temperature tensile deformations of up to 1% without cracking. A thickness T2 of at least around 0.002 inch and preferably around 0.005 inch is desirable in order to provide a satisfactory long lasting bearing surface for a roller cutter drill bit. The separate bearing elements 76, 82, 84, and 86 are all formed of a superalloy material while the adjacent bearing surfaces of journal 20 and roller cutter 60 are not normally formed of superalloy materials due to cost and the difficulty of fabrication operations such as drilling, threading, welding, and hardsurfacing with a superalloy material. While radial bushings 82, 84 and thrust washer 86 have been illustrated in the drawings as floating type bearing elements with opposite faces thereof having an aluminide coated surface thereon, it may be desirable under certain conditions to press fit or fix bushings 82, 84 and thrust washers 86 to journal 20 or roller cutter 60. In this instance, it would only be necessary to provide an aluminide coating to only the exposed bearing surface of the bearing element.

The aluminide coating applied to main radial bushing 82 is applied in a similar manner to radial bushing 84, thrust washer 86, and retaining ring 76. While shoulder 78 on retaining ring 76 is normally the only thrust bearing surface on retaining ring 76, it may be desirable to provide the aluminide coating on all of the external surfaces of ring 76 except screw threads 70.

While the example set forth above applies the aluminide coating by a pack-diffusion process, it is to be understood that the aluminide coating can be applied, for example, by plasma spraying, electron beam evaporation, electroplating, sputtering or slurry deposition of metallic aluminum followed by a suitable reaction treatment. Formation of the aluminide intermetallic layer may proceed by inter-diffusion of aluminum with a substrate element or alternatively, by reaction with a co-deposited metal species.

An aluminide coating for a superalloy bearing element surface between a roller cutter and journal of a drill bit in accordance with the foregoing will provide satisfactory performance at bearing surface temperatures up to and above 500° F. and including thermal load spikes as high as around 1000° F. which may be encountered particularly with high speed downhole motors, and at PV (pressure X velocity product) ranges as high as 1.2 million foot pounds per square inch minute (ft.lb/in$^2$ min).

The following are set forth as specific examples of laboratory tests conducted in accordance with this invention for the applying of the aluminide coating to surfaces of superalloy bearing elements for roller cutter drill bits.

EXAMPLE 1

Laboratory tests or simulated bearing elements were run in standard rock bit grease in a range of PV's from 250,000 to 750,000 ft lb/in$^2$ min. This method provides a somewhat more severe test than the corresponding PV value in an actual bit bearing because of atmospheric operating pressures and heat-flow restrictions.

Inconel 718 coupons commercially-coated with nickel aluminide Turbine Metal Technology (TMT 2813) to a thickness of 0.004 inches, hardened to 47 HRC (Rockwell C hardness), and finished to less than 20 microinches Ra (roughness average) were run against typical hardened rock bit steels including AISI 4340 at 43 HRC and carburized AISI 4121, 9315, and SAE EX55 at 58 HRC with 15 microinches Ra finish.

Typical operating temperature and galling failure behaviors are compared in Table 1 with those of standard materials couples including stellite run against carburized copper-inlaid steel, and silver-plated beryllium copper run against carburized steel. The following table shows results from tests at different PV's.

TABLE 1

| Material Couple ↓ PV → | 500,000 ft.lb/in$^2$ min | 700,000 ft.lb/in$^2$ min | 950,000 ft.lb/in$^2$ min |
|---|---|---|---|
| Aluminided Superalloy | **1/ 2/ 3/ 4 | 1/ 2/ 3/ 4 | — |
| vs | >50/200/480/N.A. | >50/250/650/N.A. | |
| Hardened Steel | | | |
| Stellite | | | |
| vs | 25/450/520/650 | — | 1/*/600/650 |
| Cu-Inlayed Hardened Steel | | | |
| Ag-Plated Cu—Be | | | |
| vs | 10/300/400/500 | 5/350/400/500 | |
| Hardened Steel | | | |

**Key: 1/2/3/4
1 - time to seizure, hours
2 - stable operating temperature, °F. ("*" indicates continuously increasing)
3 - maximum observed recovery temperature
4 - seizure temperature

EXAMPLE 2

Inconel 718 sheet material 0.060 inch thick was cut to form washer elements and bushing preforms which were subsequently roll-formed. These were aluminide-coated to a depth of 0.005 inches, heat treated, and finished to a roughness of 15 microinches rms by diamond finishing for incorporation as rock bit bearing elements.

The aluminide coating was developed in a compound diffusion process where the Inconel substrate material was packed in a mixture of alumina powder, aluminum, and ammonium chloride, heated to about 1400° F. and held for 4 hours under inert gas. The parts were then ductilized at about 1900° F. for 1 hour, and air cooled, which process also served to solutionize the substrate. The resulting aluminide layer comprises predominantly the NiAl phase with smaller amounts of Ni$_2$Al$_3$.

After coating, the elements were aged at about 1300° F. for eight hours, furnaced cooled to 1150° F. and held for 10 hours to produce a yield strength of about 180,000 psi. Finishing was conducted using metal-bonded 20 micron diamond powder on a compliant substrate material designated as "Diapad" manufactured by 3M Company, Minneapolis, Minn.

The elements were evaluated in a 7-7/8 roller cone bit laboratory endurance test apparatus subjecting the thrust bearings to PV's of about 350,000 ft.lb/in$^2$ min., corresponding to moderate services applications. Washers run with as-coated roughnesses of 45-55 microinches rms ran at temperatures near 500° F. for several hours until breakin was affected, thereafter falling to temperatures of below 150° F. Bearing failure occurred after about 31 hours due to seal failure caused by breakin-generated wear debris.

Washers finished to 15 microinches Ra exhibited an almost imperceptible breakin period lasting only a few minutes and peaking at 200° F. before falling to below 150° F. A standard-configuration thrust face of stellite on carburized steel with copper inlays (no floating element) ran about 100° F. hotter under these conditions. Neither the fnished superalloy-bushing bearing system nor the standard bearing system showed any onset of catastrophic degradation processes under these test conditions.

While a preferred manner of finishing utilizes a flexible diamond impregnated sheet secured to an elastomer or polymer-foam substrate with the bearing surface rotary-hand-lapped by the sheet to the desired finish for the bearing surface, other mechanized finishing methods could be employed using similar principles.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A roller cutter drill bit for drilling a well bore and comprising:
    a bit body having an upper end adapted to be detachably connected to a drill string for the drill bit;
    a leg projecting from said body and having a journal on its lower end;
    a roller cutter mounted for rotation on said journal; and
    a separate sliding bearing element positioned between said roller cutter and said journal, said bearing element having at least one bearing surface comprising an aluminide coated superalloy bearing material selected from the group consisting of nickel, cobalt, and iron.

2. A roller cutter drill bit as set forth in claim 1 wherein said bearing element comprises a floating bearing positioned between said journal and said roller cutter and having a thickness of at least around 1/32 inch.

3. A roller cutter drill bit as set forth in claim 2 wherein a plurality of floating bearings are positioned between said journal and said roller cutter including flat washer-type thrust bearings and radial bushing-type bearings.

4. A roller cutter as set forth in claim 1 wherein said bearing surface has a hardness of at least around 630 kg/mm$^2$ KHN.

5. A roller cutter drill bit as set forth in claim 1 wherein a separate externally threaded ring is received within an annular groove in said journal, and said roller cutter is threaded onto said threaded ring for securing of said roller cutter onto said journal for rotation, said threaded ring having a thrust bearing surface formed of an aluminide coated superalloy material contacting said journal.

6. A roller cutter drill bit as set forth in claim 1 wherein said aluminide coated superalloy bearing material is of a thickness, hardness, and strength designed for use on bearings having a PV range as high as one million foot pounds per inch square minute and at surface temperatures over 500° F.

* * * * *